United States Patent Office.

ABBOT R. DAVIS, OF CAMBRIDGE, MASSACHUSETTS.

Letters Patent No. 74,056, dated February 4, 1868.

IMPROVED PROCESS OF TREATING WOOD FOR COVERING WALLS, &c.

*The Schedule referred to in these Letters Patent and making part of the same.*

TO ALL WHOM IT MAY CONCERN:

Be it known that I, ABBOT R. DAVIS, of Cambridge, in the county of Middlesex, and State of Massachusetts, have invented a Process of Treating Wood, when used as a Covering for Plastered Walls, and for other purposes, where wood veneering is employed; and I hereby declare the following to be a full, clear, and exact description thereof.

My present invention has particular reference to the subject embraced in Letters Patent of the United States, granted to me on the twenty-sixth day of November, A. D. 1867; and my invention consists in the employment of glycerine for saturating the thin sheets or laminæ of wood to be used as a wall covering, or for other purposes, whereby the sheets are rendered soft and plastic, and thus prevented from cracking and breaking when exposed to a dry atmosphere, before or after being applied to the wall or other surface.

To enable others skilled in the art to understand and use my invention, I will proceed to describe the manner in which I have carried it out.

Glycerine and water, in about the proportion of one part of the former to two or three of the latter, are mixed together, the two ingredients readily uniting. The thin sheets of wood above referred to are now saturated with this mixture, and then placed where the water may evaporate therefrom, the glycerine still being retained by the wood, and being absorbed by it, so as to cause it to remain permanently soft and pliable. The amount of glycerine to be mixed in water may be increased according to the nature and degree of hardness of the wood to be saturated, but I have found the mixture produced by the ingredients in about the proportions first named to answer a good purpose, and glycerine alone may be used without departing from the spirit of my invention.

I am aware that glycerine has been employed for saturating sponge, to render it elastic for use, as a substitute for hair and other material for filling mattresses. The application of glycerine for this purpose I do not, however, claim, but confine myself to the following, viz:

*Claim.*

What I claim as my invention, and desire to secure by Letters Patent, is—

The employment of glycerine for saturating thin sheets or laminæ of wood, to be used as a wall covering or for other purposes, substantially as described.

ABBOT R. DAVIS.

Witnesses:
N. W. STEARNS,
P. E. TESCHEMACHER.